United States Patent [19]

Chmiel

[11] Patent Number: 5,235,265

[45] Date of Patent: Aug. 10, 1993

[54] MULTI-LEVEL MOTOR LOAD SENSING CIRCUIT

[75] Inventor: Steven F. Chmiel, Milwaukee, Wis.

[73] Assignee: Rexnord Corporation, Stearns Division, Milwaukee, Wis.

[21] Appl. No.: 826,408

[22] Filed: Jan. 27, 1992

[51] Int. Cl.$^5$ .............................................. H02P 1/42
[52] U.S. Cl. .................................................... 318/786
[58] Field of Search ........................ 318/786, 787, 778

[56] References Cited

U.S. PATENT DOCUMENTS

| | | | |
|---|---|---|---|
| 4,658,195 | 4/1987 | Min | 318/786 |
| 4,670,697 | 6/1987 | Wrege et al. | 318/786 |
| 4,703,387 | 10/1987 | Miller | 318/786 |
| 4,719,399 | 1/1988 | Wrege | 318/786 |
| 4,751,449 | 6/1988 | Chmiel | 318/786 |
| 4,751,450 | 6/1988 | Lorenz et al. | 318/786 |
| 4,782,278 | 11/1988 | Bossi et al. | 318/786 |
| 5,017,853 | 5/1991 | Chmiel | 318/786 |

Primary Examiner—William M. Shoop, Jr.
Assistant Examiner—John W. Cabeca
Attorney, Agent, or Firm—Andrus, Sceales, Starke & Sawall

[57] ABSTRACT

A multi-level motor load sensing circuit senses first, second and third ranges of auxiliary winding voltage and provides a load-too-high signal for the first range, a load-OK signal for the second range, and a load-too-low signal for the third range, and provides an output which transitions from the load-too-high signal to the load-OK signal to the load-too-low signal as auxiliary winding voltage increases from the first range to the second range to the third range, and which transitions from the load-too-low signal to the load-OK signal to the load-too-high signal as auxiliary winding voltage decreases from the third range to the second to the first range. The output transitions twice during each of rising and falling values of auxiliary winding voltage between the first and third ranges. Hysteresis with improved tracking is also provided.

17 Claims, 3 Drawing Sheets

MULTI-LEVEL MOTOR LOAD SENSING CIRCUIT

BACKGROUND AND SUMMARY

The invention relates to load sensors for AC induction motors.

The invention arose during development efforts to provide a load sensor in various applications. One such application is a gas furnace where it is desired that there be sufficient airflow before a gas jet is turned on. This is accomplished by sensing blower or fan motor load. Multiple ranges of motor load are sensed. If the motor load is too high, a load-too-high signal is generated, indicating insufficient airflow, and the gas jet is inhibited from being turned on. If the motor load is within a given acceptable range, a load-OK signal is generated, indicating sufficient airflow, and the gas jet is enabled. If the motor load is too low, for example if the fan becomes loose on the motor shaft, a load-too-low signal is generated, indicating insufficient airflow, and the gas jet is disabled. In the preferred embodiment, the sensing of multiple ranges of blower or fan motor load is accomplished by sensing the speed of the motor driving the blower or fan, which in turn is accomplished by sensing the magnitude of auxiliary winding voltage of the motor.

It is known in the prior art to sense motor load as a function of motor speed which in turn is a function of auxiliary winding voltage. For example, it is known in motor starting circuitry to sense increasing auxiliary winding voltage, and at a given cut-out threshold, actuate a disconnect switch to de-energize the auxiliary winding at cut-out speed. It is also known in such starting circuitry to re-energize the auxiliary winding at cut-in speed to accelerate or restart the motor from a stall or overload condition. Examples of such starting circuitry are shown in U.S. Pat. Nos. 4,622,506, 4,658,195, 4,670,697, 4,719,399, 4,751,449, 4,751,450, 4,782,278, 5,017,853, assigned to the assignee of the present invention.

The present invention applies various aspects of the above noted motor starting technology and improvements thereof to multi-level load sensing applications. The present invention may be used alone or in combination with motor starting circuitry. In the preferred embodiment, the invention is used in a permanent split capacitor motor, though the invention is usable in other motors including a start run capacitor motor, a start capacitor motor, and a split phase motor.

DETAILED DESCRIPTION

Figure 1:
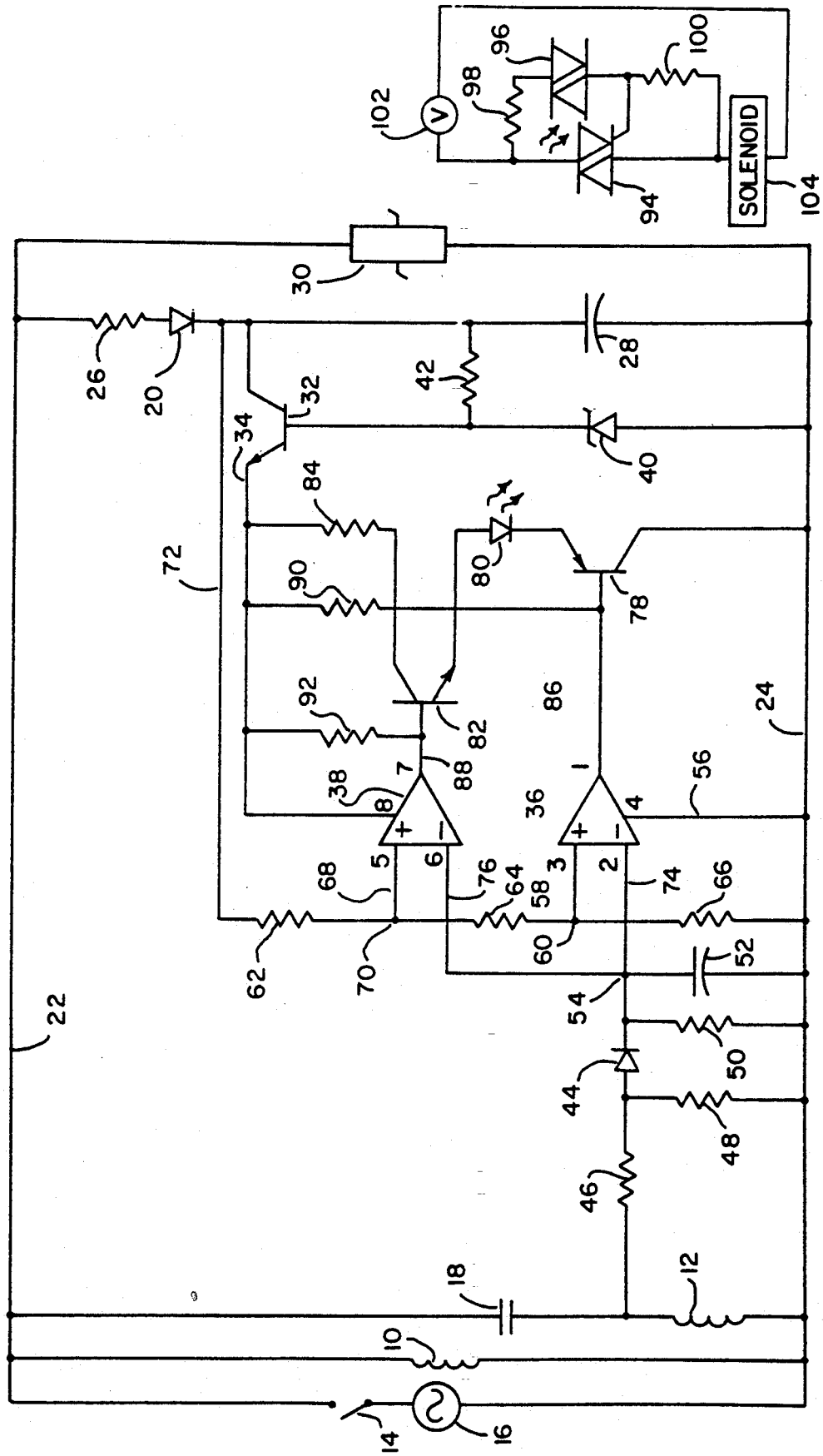
FIG. 1 is a circuit diagram illustrating circuitry constructed in accordance with the invention.

Referring to FIG. 1, a permanent split capacitor motor has a main winding 10 and an auxiliary winding 12 connectable through a main switch 14 to an AC power source 16. Capacitor 18 in series with auxiliary winding 12 provides phase shift for starting and running torque.

A main voltage detector circuit including diode 20 senses main line voltage from AC source 16 across lines 22 and 24. Voltage from AC source 16 is sensed through resistor 26 and half wave rectifying diode 20, and filtered by capacitor 28. Varistor 30 provides transient protection. An NPN bipolar pass transistor 32 has its emitter-collector circuit connected between the cathode of diode 20 and line 34 which provides a regulated DC power supply voltage line for a pair of comparators 36 and 38, to be described. The base circuit of transistor 32 includes a zener diode 40 applying a limited voltage from AC source 16 through diode 20 to the base of transistor 32 to bias the latter into conduction. Base drive current is supplied through resistor 42.

An auxiliary voltage detector circuit including diode 44 is connected across auxiliary winding 12 for sensing auxiliary winding voltage. The auxiliary winding voltage is reduced by the voltage divider network provided by resistors 46 and 48 and sensed through half wave rectifying diode 44 and resistor 50 and filtered by capacitor 52, to provide sensed auxiliary winding voltage at node 54.

Voltage comparators 36 and 38 are provided by a dual comparator integrated circuit, provided by an LM393 integrated circuit, where manufacturer assigned pin number designations are shown to facilitate understanding, having power supply voltage provided at line 34, and are connected by line 56 to a common reference at line 24. Non-inverting input 58 of comparator 36 senses main line voltage at node 60 as reduced by the voltage divider network provided by resistors 62, 64 and resistor 66. Non-inverting input 68 of comparator 38 senses main line voltage at node 70 as reduced by the voltage divider network provided by resistor 62 and resistors 64, 66. The noted voltage divider network is connected by line 72 to the cathode of diode 20 and provides floating line compensation. Inverting input 74 of comparator 36 senses auxiliary winding voltage at node 54. Inverting input 76 of comparator 38 senses auxiliary winding voltage at node 54.

The emitter-collector circuit of a PNP bipolar transistor 78, a light emitting diode, LED, 80, the emitter-collector circuit of an NPN bipolar transistor 82, and a resistor 84 are connected in series between lines 34 and 24. The base of transistor 78 is connected to output 86 of comparator 36. The base of transistor 82 is connected to the output 88 of comparator 38. A pull-up resistor 90 is connected between line 34 and comparator output 86. A pull-up resistor 92 is connected between line 34 and comparator output 88. An opto-driver switch is provided by a Toshiba TLP3012 integrated circuit, including LED 80, power triac 94 and pilot triac 96. LED 80 is optically coupled to light responsive element 96 to drive the latter into conduction to in turn supply gate current through resistor 98 to the gate of triac 94 to bias the latter into conduction. Resistor 100 reduces gate sensitivity and prevents false triggering. Triac 94 is connected in series with voltage source 102 and solenoid 104. Solenoid 104 provides a control function, for example opening a gas valve in a furnace.

Figure 2:
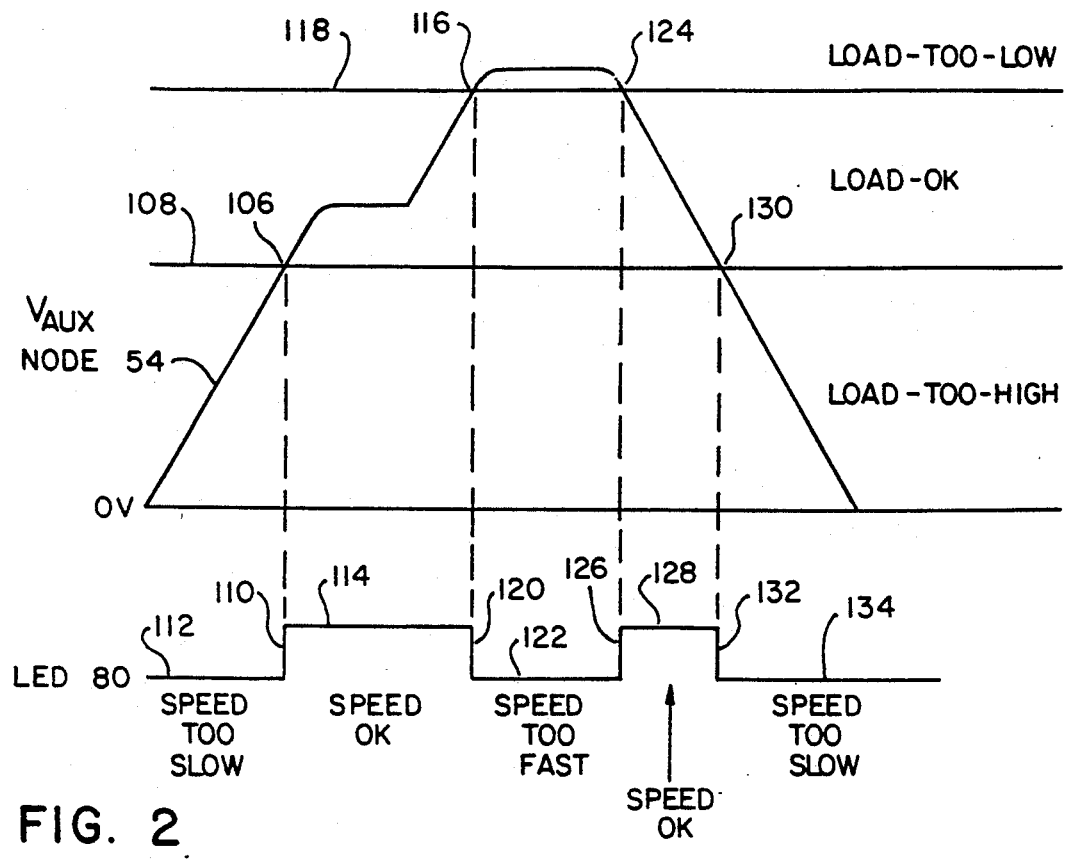
FIG. 2 is a waveform diagram illustrating operation of the circuitry of FIG. 1.

In operation, when auxiliary winding voltage at node 54 increases as shown at 106, FIG. 2, above main line voltage at node 60 as shown at level 108, then the output 86 of comparator 36 transitions low, which biases transistor 78 into conduction to conduct current from line 34 through LED 80, which in turn emits light and optically triggers triacs 96 and 94 into conduction, to in turn energize solenoid 104. In FIG. 2, LED 80 transitions at 110 from non-light-emitting state 112 to light-emitting state 114. If auxiliary winding voltage continues to increase as shown at 116, FIG. 2, above the main line voltage at node 70, as shown at level 118, then output 88 of comparator 38 goes low, such that transistor 82 is rendered nonconductive which in turn terminates current flow through LED 80, and LED 80 transitions at 120 from light-emitting state 114 to non-light-emitting state 122 and hence triac 94 turns off at the next half cycle of AC source 16, which in turn de-energizes solenoid 104. If auxiliary winding voltage decreases as shown at 124 below level 118, then output 88 of comparator 38 transitions high to bias transistor 82 into conduction to conduct current through LED 80, and LED 80 transitions at 126 from non-light-emitting state 122 to light-emitting state 128, which in turn optically triggers triacs 96 and 94 into conduction to energize solenoid 104. If auxiliary winding voltage continues to decrease as shown at 130 below level 108, then output 86 of comparator 36 transitions high, to render transistor 78 nonconductive, which terminates current flow through LED 80, and LED 80 transitions at 132 from light-emitting state 128 to non-light-emitting state 134, such that triac 94 turns off at the next half cycle of AC source 16, to de-energize solenoid 104. When the auxiliary winding voltage at node 54 is between levels 108 and 118, LED 80 emits light (LED states 114, 128), and provides a load-OK signal. If the auxiliary winding voltage is below level 108 (LED states 112, 134), then motor speed is too slow, and the load is too high. If the auxiliary winding voltage is above level 118 (LED state 122), then the motor speed is too fast and the load is too low, e.g. the fan on the motor shaft has become loose.

The circuitry senses first, second and third ranges of auxiliary winding voltage and provides a load-too-high signal 112, 134 for the first range below level 108, a load-OK signal 114, 128 for the second range between levels 108 and 118, and a load-too-low signal 122 for the third range above level 118. LED 80 transitions from the load-too-high signal 112 to the load-OK signal 114 to the load-too-low signal 122 as the auxiliary winding voltage changes from the first range to the second range to the third range. LED 80 transitions from the load-too-low signal 122 to the load-OK signal 128 to the load-too-high signal 134 as auxiliary winding voltage changes from the third range to the second range to the first range. LED 80 transitions twice as auxiliary winding voltage varies from the first range to the third range. LED 80 also transitions twice as auxiliary winding voltage varies from the third range to the first range. LED 80 transitions twice during each of rising and falling values of auxiliary winding voltage between the first and third ranges. Levels 108 and 118 vary with main line voltage via connection 72 and provide compensation of same such that sensed motor load generating the load-too-high signal, the load-OK signal and the load-too-low signal is independent of main line voltage.

In the noted application, in the first range below level 108, the load is too high and the blower or fan motor speed is too slow to turn on the gas in a furnace, and hence solenoid 104 is de-energized, for example to disable or inhibit a gas jet. In the second range between levels 108 and 118, the blower motor load and speed is OK, and hence solenoid 104 is energized, to enable gas to be introduced. In the third range above level 118, the blower motor load is too low and speed is too fast, indicating, for example, that the fan has become loose on the motor shaft or some other event causing loss or reduction of load, and hence solenoid 104 is de-energized, to disable the gas jet.

Figure 4:
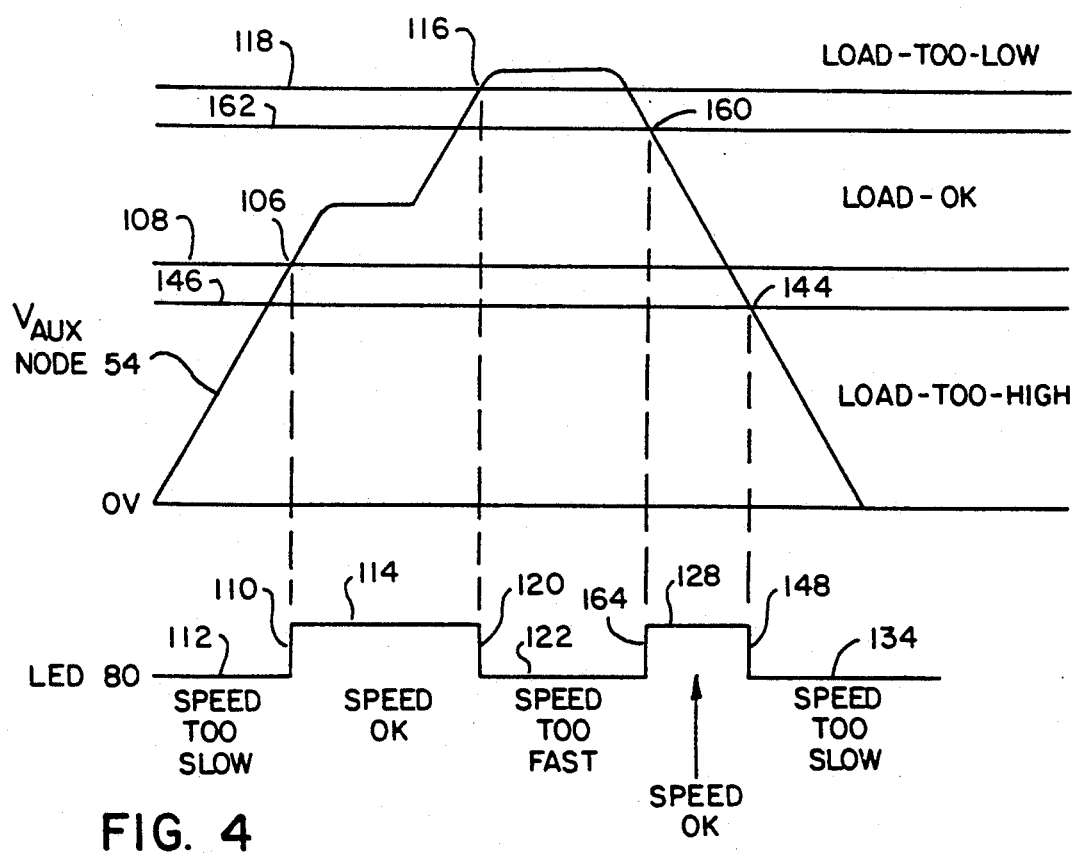
FIG. 4 is a waveform diagram illustrating operation of the circuitry of FIG. 3.
Figure 3:
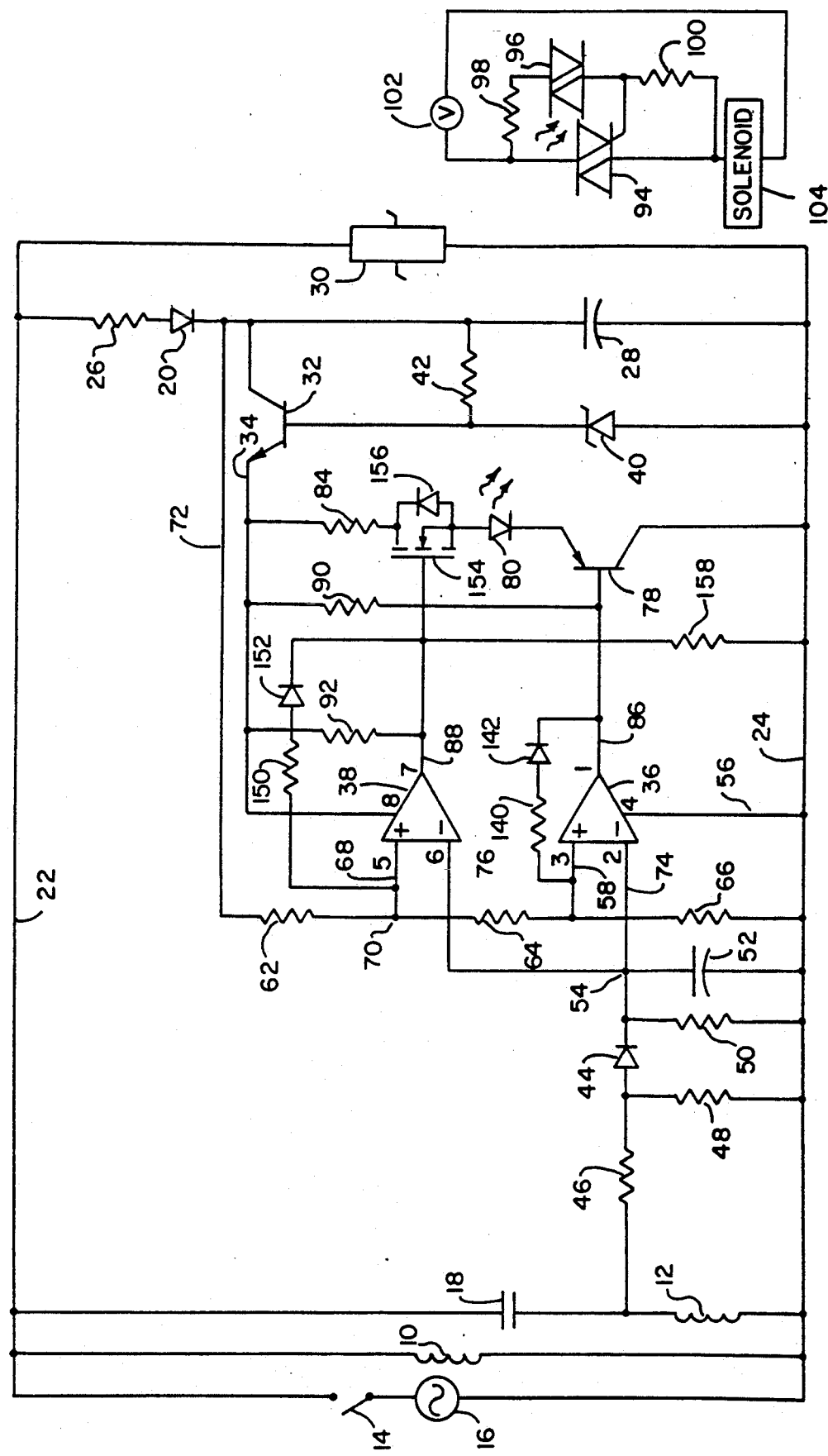
FIG. 3 is a circuit diagram illustrating further circuitry constructed in accordance with the invention.

FIG. 3 shows a further and preferred embodiment with hysteresis and improved tracking, and uses like reference numerals from FIG. 1 where appropriate to facilitate understanding. Resistor 140 and diode 142 are connected between non-inverting input 58 and output 86 of comparator 36. When comparator output 86 transitions low, resistor 140 and diode 142 conduct current therethrough from non-inverting input 58 to output 86 and lower the voltage at non-inverting input 58 such that auxiliary winding voltage at node 54 must decrease at 144, FIG. 4, to a level 146 below level 108 before comparator output 86 can transition high to turn off transistor 78, thus providing hysteresis. Turn-off of transistor 78 terminates current flow through LED 80, and LED 80 transitions at 148 from light-emitting state 128 to non-light-emitting state 134. Diode 142 blocks current flow from power supply voltage line 34 through pull-up resistor 90 to non-inverting input 58 to remove the regulated power supply voltage component from sensed main line voltage at comparator input 58. This improves tracking response of levels 108 and 146 to changing main line voltage. Furthermore, main line voltage at comparator input 58 is not offset by the regulated power supply voltage from line 34. In the absence of diode 142, a component of the regulated power supply voltage from line 34 through pull-up resistor 90 would be present through resistor 140 at comparator input 58, and hence main line voltage at comparator input 58 would be offset by such regulated power supply voltage. This is undesirable because the regulated power supply voltage is relatively constant, and does not vary with main line voltage.

Resistor 150 and diode 152 are connected between non-inverting input 68 and output 88 of comparator 38, and perform as above described for resistor 140 and diode 142. Bipolar transistor 82 of FIG. 1 is replaced by field effect transistor, FET, 154 in FIG. 3. FET 154 includes an inherent reverse diode 156. Resistor 15B provides gate referencing for FET 154. When comparator output 88 is low, resistor 150 and diode 152 conduct current therethrough from non-inverting input 68 to output 88 and reduce the voltage at comparator input 68 such that auxiliary winding voltage at comparator input 76 must decrease at 160, FIG. 4, to a level 162 which is less than level 118 and greater than level 108 before comparator output 88 can transition high to bias transistor 154 into conduction, thus providing hysteresis. Turn-on of transistor 154 conducts current through LED 80, and LED 80 transitions at 164, FIG. 4, from non-light-emitting state 122 to light-emitting state 128, which in turn optically triggers triacs 96 and 94 into conduction to energize solenoid 104. Diode 152 blocks current flow from regulated power supply voltage line 34 through pull-up resistor 92 and resistor 150 to comparator input 68 to remove the regulated power supply voltage component from sensed main line voltage at comparator input 68. This improves tracking response of levels 118 and 162 to changing main line voltage. Main line voltage at comparator input 68 is not offset by regulated power supply voltage from line 34. Levels 146, 108, 162 and 118 vary with main line voltage via connection 72 and provide compensation of main line voltage such that sensed motor load generating the load-too-high signal, the load-OK signal and the load-too-low signal is independent of main line voltage.

Bipolar transistor 82 in FIG. 1 is replaced by FET 154 in the hysteresis version in FIG. 3 to enable comparator output 88 to remain high when the transistor is conductive, to prevent hysteresis when undesired. In FIG. 1, when transistor 82 turns on, there are only three junction drops from comparator output 88 to line 24, namely transistor 82, LED 80, and transistor 78, and hence comparator output 88 does not remain high. If there were a hysteresis connection between output 88 and input 68 of comparator 38 in FIG. 1, the voltage at comparator input 68 would be reduced by such connection, even during rising values of auxiliary winding voltage when auxiliary winding voltage at comparator input 76 is less than main line voltage at comparator input 68, because conduction of bipolar transistor 82 across its base-emitter draws comparator output 88 low. FET 154 has an insulated gate as a control terminal, and hence when output 88 of comparator 38 transitions high in FIG. 3, such output 88 remains high, such that the voltage at comparator input 68 is not reduced by the connection through resistor 150 and diode 152 during rising values of auxiliary winding voltage when auxiliary winding voltage at input 76 is less than main line voltage at input 68, thus preventing hysteresis during such intervals. Instead, hysteresis is effective only during decreasing values of auxiliary winding voltage when auxiliary winding voltage at input 76 is greater than main line voltage at input 68 and comparator output 88 is low.

In another embodiment, transistor 82 is replaced by an SCR connected in parallel with LED 80 and transistor 78, and shunts current away from LED 80 and provides latching of LED 80 in the non-light-emitting state 122 if an overspeed condition is detected.

It is recognized that various equivalents, alternatives and modifications are possible within the scope of the appended claims.

I claim:

1. In an AC induction motor having a main winding and an auxiliary winding both connectable to an AC power source, a multi-level motor load sensing circuit comprising:

a main voltage detector sensing main line voltage from said AC source;

an auxiliary voltage detector sensing auxiliary winding voltage;

voltage comparator circuitry having a first input connected to said main voltage detector and a second input connected to said auxiliary voltage detector and comparing said auxiliary winding voltage against said main line voltage, and outputting a load-OK signal when said auxiliary winding voltage increases to a first level relative to said main line voltage, and outputting a load-too-low signal when said auxiliary winding voltage further increases to a second level relative to said main line voltage, said second level being greater than said first level.

2. The invention according to claim 1 wherein said voltage comparator circuitry outputs a load-OK signal when said auxiliary winding voltage decreases below said second level, and outputs a load-too-high signal when said auxiliary winding voltage further decreases below said first level.

3. The invention according to claim 2 wherein said voltage comparator circuitry outputs said load-too-high signal when said auxiliary winding voltage decreases to a reduced level less than said first level.

4. The invention according to claim 2 wherein said voltage comparator circuitry outputs said load-OK signal when said auxiliary winding voltage decreases to a given level less than said second level and greater than said first level.

5. The invention according to claim 2 wherein said voltage comparator circuitry outputs said load-too-high signal when said auxiliary winding voltage decreases to a third level less than said first level, and said voltage comparator circuitry outputs said load-OK signal when said auxiliary winding voltage decreases to a fourth level less than said second level and greater than said first level.

6. In an AC induction motor having a main winding and an auxiliary winding both connectable to an AC power source, a multi-level motor load sensing circuit comprising:

a main voltage detector sensing main line voltage from said AC source;

an auxiliary voltage detector sensing auxiliary winding voltage;

a first voltage comparator having a first input connected to said main voltage detector, a second input connected to said auxiliary voltage detector, and an output;

a first semiconductor switch having on and off conduction states and connected to said output of said first voltage comparator, such that when said auxiliary winding voltage increases above a first level relative to said main line voltage, said first voltage comparator actuates said first semiconductor switch from one of its said conduction states to the other of its said conduction states, and such that when said auxiliary winding voltage decreases below said first level, said first voltage comparator actuates said first semiconductor switch from its said other conduction state to its said one conduction state;

a second voltage comparator having a first input connected to said main voltage detector, a second input connected to said auxiliary voltage detector, and an output;

a second semiconductor switch having on and off conduction states and connected to said output of said second voltage comparator, such that when said auxiliary winding voltage increases above a second level relative to said main line voltage and higher than said first level, said second voltage comparator actuates said second semiconductor switch from one of its said conduction states to the other of its said conduction states, and such that when said auxiliary winding voltage decreases below said second level, said second voltage comparator actuates said second semiconductor switch from its other said conduction state to its said one conduction state;

a signal generating semiconductor element connected to said first and second semiconductor switches and generating a load-too-high signal when said first semiconductor switch is in its said one conduction state, and generating a load-OK signal when said first semiconductor switch is in its said other conduction state and said second semiconductor switch is in its said one conduction state, and generating a load-too-low signal when said second semiconductor switch is in its said other conduction state.

7. The invention according to claim 6 wherein said signal generating semiconductor element is electrically connected in series with at least one of said first and second semiconductor switches.

8. The invention according to claim 6 wherein said first and second semiconductor switches are electrically connected in series with each other.

9. The invention according to claim 6 wherein said signal generating semiconductor element and said first and second semiconductor switches are all connected in series with each other.

10. The invention according to claim 6 comprising:
a power supply circuit connected between said AC power source and said comparators and providing regulated power supply voltage to said comparators on a power supply voltage line;
a pull-up resistor connecting said output of said first comparator to said power supply voltage line;
a diode connected between said output of said first comparator and said first input of said first comparator and changing the voltage at said first input of said first comparator such that auxiliary winding voltage must decrease to a reduced level less than said first level before said first semiconductor switch is actuated from its said other conduction state to its said one conduction state, wherein said first level and said reduced level vary with main line voltage, and such that said diode blocks current flow between said first input of said first comparator and said power supply voltage line through said pull-up resistor such that said diode removes the regulated power supply voltage component from the sensed main line voltage at said first input of said first comparator, to improve tracking response of said first level and said reduced level to changing main line voltage, and such that said main line voltage at said first input of said first comparator is not offset by said regulated power supply voltage.

11. The invention according to claim 6 comprising:
a power supply circuit connected between said AC power source and said comparators and providing regulated power supply voltage to said comparators on a power supply voltage line;
a pull-up resistor connecting said output of said second comparator to said power supply voltage line;
a diode connected between said output of said second comparator and said first input of said second comparator and changing the voltage at said first input of said second comparator such that auxiliary winding voltage must decrease to a given level less than said second level and greater than said first level before said second semiconductor switch is actuated from its said other conduction state to its said one conduction state, wherein said second level and said given level vary with main line voltage, and such that said diode blocks current flow between said first input of said second comparator and said power supply voltage line through said pull-up resistor such that said diode removes the regulated power supply voltage component from sensed main line voltage at said first input of said second comparator to improve tracking response of said second level and said given level to changing main line voltage, and such that said main line voltage at said first input of said second comparator is not offset by said regulated power supply voltage.

12. The invention according to claim 11 wherein said second semiconductor switch is a field effect transistor having a gate connected to said output of said second comparator, and wherein said diode provides hysteresis reducing the voltage level at said first input of said second comparator only during decreasing values of auxiliary winding voltage when auxiliary winding voltage at said second input of said second comparator is greater than main line voltage at said first input of said second comparator, and preventing hysteresis during increasing values of auxiliary winding voltage when auxiliary winding voltage at said second input of said second comparator is less than main line voltage at said first input of said second comparator.

13. The invention according to claim 6 comprising:
a power supply circuit connected between said AC source and said comparators and providing power supply voltage to said comparators on a power supply voltage line;
a first pull-up resistor connecting said output of said first comparator to said power supply voltage line, said first pull-up resistor having a first end connected to said power supply voltage line, and a second end connected to a first node between said first semiconductor switch and said output of said first comparator;
a second pull-up resistor connecting said output of said second comparator to said power supply voltage line, said second pull-up resistor having a first end connected to said power supply voltage line, and a second end connected to a second node between said second semiconductor switch and said output of said second comparator;
a first diode connected between said output of said first comparator and said first input of said first comparator and changing the voltage at said first input of said first comparator such that auxiliary winding voltage must decrease to a third level below said first level before said first semiconductor switch is actuated from its said other conduction state to its said one conduction state, and such that said first diode blocks current flow between said first input of said first comparator and said power supply voltage line through said first pull-up resistor;
a second diode connected between said output of said second comparator and said first input of said second comparator and changing the voltage at said first input of said second comparator such that auxiliary winding voltage must decrease to a fourth level less than said second level and greater than said first level before said second semiconductor switch is actuated from its said other conduction state to its said one conduction state, and such that said second diode blocks current flow between said first input of said second comparator and said power supply voltage line through said second pull-up resistor.

14. The invention according to claim 13 wherein:
said power supply circuit provides a regulated power supply voltage which is substantially constant;
said first, second, third and fourth levels vary with said main line voltage and provide compensation of same such that sensed motor load generating said load-too-high signal, said load-OK signal and said load-too-low signal is independent of said main line voltage;

said first diode is connected between said first input of said first comparator and said output of said first comparator in a polarity permitting current flow therethrough to decrease said third level below said first level, and removing the regulated power supply voltage component from the sensed main line voltage at said first input of said first comparator, to improve tracking response of said first and third levels to . changing main line voltage, and such that said main line voltage at said first input of said first comparator is not offset by said regulated power supply voltage;

said second diode is connected between said first input of said second comparator and said output of said second comparator in a polarity permitting current flow therethrough to decrease said fourth level below said second level, and removing the regulated power supply voltage component from the sensed main line voltage at said first input of said second comparator, to improve tracking response of said second and forth levels to changing main line voltage, and such that said main line voltage at said first input of said second comparator is not offset by said regulated power supply voltage.

15. The invention according to claim 14 wherein said first semiconductor switch comprises a bipolar transistor, and said second semiconductor switch comprises a field effect transistor.

16. In an AC induction motor having a given motor parameter which changes as a function of motor load, a three level load sensor comprising a sensing circuit sensing first, second and third ranges of said parameter and providing a load-too-high signal for said first range, a load-OK signal for said second range, and a load-too-low signal for said third range, and providing an output which transitions from said load-too-high signal to said load-OK signal to said load-too-low signal as said parameter changes from said first range to said second range to said third range, and which transitions from said load-too-low signal to said load-OK signal to said load-too-high signal as said parameter changes from said third range to said second range to said first range, such that said output transitions twice as said parameter varies from said first range to said third range, and said output also transitions twice as said parameter varies from said third range to said first range, such that said output transitions twice during each of rising and falling values of said parameter between said first and third ranges.

17. In an AC induction motor having a main winding and an auxiliary winding both connectable to an AC power source, a three level motor load sensing circuit comprising:
a main voltage detector sensing main line voltage from said AC source;
an auxiliary voltage detector sensing auxiliary winding voltage;
voltage comparator circuitry sensing first, second and third ranges of said auxiliary winding voltage and providing a load-too-high signal for said first range, a load-OK signal for said second range, and a load-too-low signal for said third range, and providing an output which transitions from said load-too-high signal to said load-OK signal to said load-too-low signal as said auxiliary winding voltage changes from said first range to said second range to said third range, and which transitions from said load-too-low signal to said load-OK signal to said load-too-high signal as said auxiliary winding voltage changes from said third range to said second range to said first range, such that said output transitions twice as said auxiliary winding voltage varies from said first range to said third range, and said output also transitions twice as said auxiliary winding voltage varies from said third range to said first range, such that said output transitions twice during each of rising and falling values of said auxiliary winding voltage between said first and. third ranges, said voltage comparator circuit comprising:
a first voltage comparator having a first input connected to said main voltage detector, a second input connected to said auxiliary voltage detector, and an output;
a first transistor having a control terminal connected to said output of said first voltage comparator;
a second voltage comparator having a first input connected to said main voltage detector, a second input connected to said auxiliary voltage detector, and an output;
a second transistor having a control terminal connected to said output of said second voltage comparator;
an opto-driver switch comprising an optically triggered semiconductor switch optically coupled to a light emitting semiconductor element, wherein said light emitting semiconductor element is electrically connected to said transistors and controlled by conduction thereof such that when said auxiliary winding voltage increases above a first level from said first range to said second range, said first transistor changes conduction state and said semiconductor element emits light, and such that when said auxiliary winding voltage increases above a second level from said second range to said third range, said second transistor changes conduction state and said semiconductor element stops emitting light, and such that when said auxiliary winding voltage decreases below said second level from said third range to said second range, said second transistor changes conduction state and said semiconductor element emits light, and such that when said auxiliary winding voltage decreases below said first level from said second range to said first range, said first transistor changes conduction state and said semiconductor element stops emitting light.

* * * * *